United States Patent
Pandey

(10) Patent No.: US 11,170,475 B2
(45) Date of Patent: Nov. 9, 2021

(54) IMAGE NOISE REDUCTION USING STACKED DENOISING AUTO-ENCODER

(71) Applicant: KLA CORPORATION, Milpitas, CA (US)

(72) Inventor: Anuj Pandey, Delhi (IN)

(73) Assignee: KLA Corporation, Milpitas, CA (US)

(*) Notice: Subject to any disclaimer, the term of this patent is extended or adjusted under 35 U.S.C. 154(b) by 11 days.

(21) Appl. No.: 16/735,128

(22) Filed: Jan. 6, 2020

(65) Prior Publication Data

US 2020/0226722 A1 Jul. 16, 2020

Related U.S. Application Data

(60) Provisional application No. 62/808,985, filed on Feb. 22, 2019.

(30) Foreign Application Priority Data

Jan. 10, 2019 (IN) .............................. 201941001278

(51) Int. Cl.
*G06T 5/00* (2006.01)
*G06T 7/00* (2017.01)

(52) U.S. Cl.
CPC ............ *G06T 5/002* (2013.01); *G06T 7/0004* (2013.01); *G06T 2207/20081* (2013.01); *G06T 2207/20084* (2013.01); *G06T 2207/30148* (2013.01)

(58) Field of Classification Search
CPC .................. G06T 5/002; G06T 7/0004; G06T 2207/20084; G06T 2207/30148; G06T 2207/20081
See application file for complete search history.

(56) References Cited

U.S. PATENT DOCUMENTS

2004/0228515 A1* 11/2004 Okabe .................. G06T 7/0004
382/145
2008/0266413 A1 10/2008 Cohen et al.
(Continued)

FOREIGN PATENT DOCUMENTS

KR 20180073704 A 7/2018
WO 2008128772 A2 10/2008
(Continued)

OTHER PUBLICATIONS

WIPO, ISR for PCT/US2020/012642, May 6, 2020.

*Primary Examiner* — Ping Y Hsieh
(74) *Attorney, Agent, or Firm* — Hodgson Russ LLP

(57) ABSTRACT

Embodiments disclosed herein may comprise receiving a run-time image of a run-time die and, with a deep learning module, identifying a characteristic noise in the run-time image, and modifying the run-time image to reduce the characteristic noise, thereby generating a de-noised run-time image. Such embodiments may be performed as methods, by systems, or from non-transitory computer-readable storage media on one or more computing devices. An image sensor of a metrology tool may capture the run-time image of the run-time die. The metrology tool may include a run-time die disposed on a specimen, a run-time image sensor, and a processor in electronic communication with the run-time image sensor. Embodiments may further comprise receiving a training image of a training die, modifying the training image, and training the deep learning module to identify the characteristic noise in the run-time image and modify the run-time image.

19 Claims, 6 Drawing Sheets

(56) References Cited

U.S. PATENT DOCUMENTS

| | | | |
|---|---|---|---|
| 2014/0136137 A1* | 5/2014 | Tarshish-Shapir | ........................... G01N 21/4788 702/108 |
| 2015/0324965 A1* | 11/2015 | Kulkarni | ................ G06F 30/30 382/144 |
| 2017/0045823 A1 | 2/2017 | Quintanilha | |
| 2017/0140524 A1* | 5/2017 | Karsenti | .............. G06K 9/6256 |
| 2017/0148226 A1 | 5/2017 | Zhang et al. | |
| 2017/0351952 A1 | 12/2017 | Zhang et al. | |
| 2019/0067060 A1* | 2/2019 | Plihal | ...................... G06T 7/001 |

FOREIGN PATENT DOCUMENTS

WO        2017210455  A1    12/2017
WO     WO2017/210455  A1 *  12/2017

* cited by examiner

IMAGE NOISE REDUCTION USING STACKED DENOISING AUTO-ENCODER

CROSS REFERENCE TO RELATED APPLICATIONS

This application claims priority to U.S. Provisional Application No. 62/808,985, filed on Feb. 22, 2019 and Indian Provisional Application 201941001278, filed on Jan. 10, 2019, the entire disclosures of which are hereby incorporated by reference.

FIELD OF THE DISCLOSURE

The disclosure generally relates to semiconductor defect inspection and review.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Across various semiconductor products, especially in the Advanced Wafer Level Packaging (aWLP) sector, wafer optical inspection faces throughput and sensitivity challenges because of noise induced by grain roughness (e.g., metal grain roughness). This challenge exacerbates when defects of interest (DOI) and nuisance signals are similar, prompting difficulty in classifying and binning the same.

Some conventional approaches for noise filtering exist. A kernel is a small matrix used for performing image processing algorithms by convolving the kernel with a portion of the image corresponding to the kernel. The kernel may be defined in various ways. Median filtering involves replacing a kernel's center pixel with the median of all the kernel's pixels. Low-pass filtering involves replacing a kernel's center pixel with the average of all the kernel's pixels. Although these noise-filtering approaches are computationally inexpensive, they pose a risk to defect detection because of their indifference towards DOI and nuisance. For tiny defects lying in the noise floor, it is difficult to selectively suppress nuisance signal without compromising on the DOI signal.

Thus, improved methods for selectively filtering nuisance without adversely affecting a DOI signal are needed.

SUMMARY OF THE DISCLOSURE

An embodiment may be a method comprising, using a processor, receiving a run-time image of a run-time die and, with a deep learning module, identifying a characteristic noise in the run-time image, and modifying the run-time image to reduce the characteristic noise, thereby generating a de-noised run-time image. The run-time image of the run-time die may be captured by an image sensor of a metrology tool. The metrology tool may be an optical metrology tool or an electron beam metrology tool.

The method may further comprise, using the processor, receiving a training image of a training die, modifying the training image such that the characteristic noise is reduced, and training the deep learning module to identify the characteristic noise in the run-time image and modify the run-time image to reduce the characteristic noise.

The method may further comprise, using the processor, detecting a defect in the de-noised run-time image. The method may further comprise, using the processor, classifying the defect as a defect-of-interest or a nuisance.

Another embodiment may be a system comprising a metrology tool. The metrology tool may include a run-time die disposed on a specimen, a run-time image sensor, and a processor in electronic communication with the run-time image sensor. The run-time image sensor may be configured to capture a run-time image of the run-time die. The processor may be configured to receive the run-time image from the run-time image sensor. The processor may be configured to, with a deep learning module, identify the characteristic noise in the run-time image, and modify the run-time image to reduce the characteristic noise and thereby generate a de-noised run-time image.

The processor may be further configured to receive a training image of a training die, modify the training image such that the characteristic noise is reduced, and train the deep learning module to identify the characteristic noise in the run-time image and modify the run-time image to reduce the characteristic noise.

The processor may be further configured to detect a defect in the de-noised run-time image. The processor may be further configured to classify the defect as a defect-of-interest or a nuisance.

Another embodiment may be a non-transitory computer-readable storage medium, comprising one or more programs for executing steps on one or more computing devices. The one or more programs be configured to execute steps to receive a run-time image captured by an image sensor of a metrology tool and, with a deep learning module, identify the identify the characteristic noise in the run-time image, and modify the run-time image to reduce the characteristic noise and thereby generate a de-noised run-time image.

The one or more programs may be further configured to execute steps to receive a training image of a training die, modify the training image such that the characteristic noise is reduced, and train the deep learning module to identify the characteristic noise in the run-time image and modify the run-time image to reduce the characteristic noise.

The one or more programs may be further configured to execute steps to detect a defect in the de-noised run-time image. The one or more programs may be further configured to execute steps to classify the defect as a defect-of-interest or a nuisance.

The deep learning module may be trained to identify the characteristic noise in the run-time image and modify the run-time image to reduce the characteristic noise.

The training image may have the characteristic noise.

Modifying the training image may generate a de-noised image. Training the deep learning module to identify the characteristic noise may include comparing a portion of the training image with a corresponding portion of the de-noised training image.

Modifying the training image may comprise one or more of pixel blob selection and smoothing, dilation, erosion, blurring, template replication, flood fill, median filtering, or low-pass filtering.

The deep learning module may be a fully-connected autoencoder or a convolutional neural network.

Modifying the run-time image to reduce the characteristic noise may include down-sampling the run-time image using an encoder layer, thereby generating a sparse-representation, and up-sampling the sparse-representation using a decoder layer, thereby generating the de-noised run-time image.

The encoder layer may be a convolution layer or a maxpool layer. The decoder layer may be a deconvolution layer or a max-unpool layer.

The run-time image sensor may be a charge-coupled device or a time-delay and integration sensor. The run-time image sensor may be configured to detect photons or electrons received from the specimen.

The run-time die may compose an advanced wafer level package.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein include methods, systems, and apparatuses for noise reduction during image pre-processing using deep learning.

Given that defects—candidates for classification as DOIs or nuisance—are scattered randomly over the defect attribute space, and random noise is generally present in an inspection layer, a deep-learning-based approach can be used to separate DOIs and nuisance. Thus, embodiments disclosed herein may provide a detailed, selective filtering approach to overcome challenging defect inspection cases in various semiconductor segments. Such embodiments may be used in an optical or electron (e-beam) inspection platform where strong background pattern noise may cause difficulty discriminating between DOIs and nuisance.

An embodiment may be described as follows. First, a set of noisy training images, representative of all of the possible variations that could occur on a wafer, may be obtained. For example, images from all portions of the die where de-noising needs to be applied may be received. Second, manual de-noising operations may be applied to the images. Third, noisy images may be paired with de-noised images to prepare for deep learning module training. Fourth, the deep learning module may be trained using the data regarding the paired images and the de-noising operations applied. This deep learning module may be then saved and attached to a recipe. Finally, an inspection of a run-time wafer may include applying the de-noising function at runtime using the deep learning module. Performance may be verified by comparing the defect quantity or quality before and after application of the proposed de-noising technique.

Figure 1A:
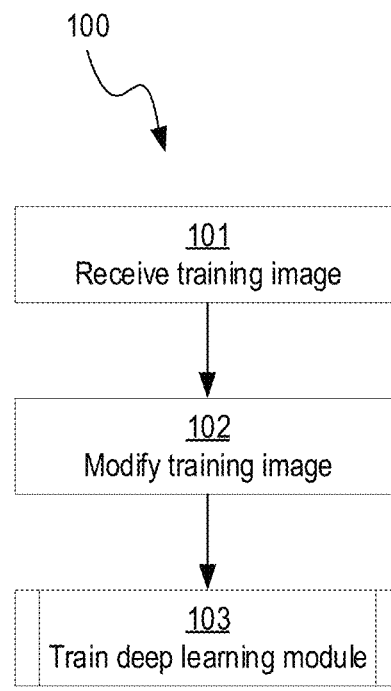
FIG. 1A illustrates an embodiment method for training a deep learning module.

FIG. 1A depicts an embodiment method 100. Method 100 may use a training image to train a deep learning module to de-noise a later-collected run-time image.

At 101, a training image may be received. The training image may be an image of a training die. The training image may be, for example, obtained using the metrology tool later used to obtain a run-time image, a different metrology tool, a simulation, or another previously-obtained image. The training image may be of a single die, multiple dies, or a portion of a die. The metrology tool may be an optical or an e-beam metrology tool.

The training image may have a characteristic noise. The characteristic noise may be induced by surface roughness, or grain, of copper or the substrate. The characteristic noise may vary dependent on material and process parameters of a particular fabrication process.

At 102, the training image may be modified. The modifications may be made such that characteristic noise (e.g., salt-and-pepper noise, or other varied noise depending on process parameters) is reduced, thus de-noising the training image. The modifications may include one or more of pixel blob selection and smoothing, dilation, erosion, blurring, template replication, flood fill, median filtering, or low-pass filtering, as explained in the following paragraphs. The technique(s) used in an embodiment may be determined based on the particular needs of the training image or based on process parameters.

In one embodiment, de-noising of the training image may be verified by manually observing the de-noised training image and calculating the signal-to-noise ration of the defect signal. In another embodiment, the trained deep learning module may be used for inspection, and the results of said inspection can be verified. The trained deep learning module may then be finalized once the obtained scan results have acceptable nuisance candidates.

The training image may be modified using pixel blob selection and smoothing. Pixel blob selection may involve selecting a region of an image having pixels with certain properties that are approximately constant, that is, each pixel in a blob may have a property (e.g., gray level) considered common to the other pixels in the blob. Blob detection may be performed using convolution. Smoothing of the blob may be performed by an identification of pixels adjacent to the center pixel having intensity levels at certain threshold criteria and assigning each a gray level, until reaching a pixel that does not meet the criteria.

The training image may be modified using dilation. Morphological dilation involves scanning an image and, with each pixel, setting its value to the maximum pixel value in a defined neighborhood size around the pixel. Dilation can be used to increase visibility of objects in an image and fill in small holes.

The training image may be modified using erosion. Morphological erosion involves scanning an image and, with each pixel, setting its value to the minimum pixel value in a defined neighborhood size around the pixel. Erosion can be preferably used to remove islands or small objects, leaving substantive image objects only.

The training image may be modified using blurring. With blurring, pixels over a certain kernel size may be averaged. Thus, an effect of metal grain or another type of noise can be reduced.

The training image may be modified using template replication. With template replication, or template copying, a part of an image—from the current or a different source—may be selected to copy and pasted to another part of the same image. Thus, rough patches on the image may be transformed to clean them.

The training image may be modified using flood fill. With flood fill, edges in an image may be detected and a constant gray level may be assigned to the pixels bounded by said edges. Flood fill may be effective in images with defined or distinguishable edges.

The training image may be modified using median filtering. Median filtering involves replacing a kernel's center pixel with the median of all of the kernel's pixels. In median filtering, pixels over a certain X-Y kernel are considered, and the center pixel in the kernel may be replaced with the median of all of the pixels in the kernel. For example, if a patch has gray levels of 120, 110, 150, 160, and 100 over a five-pixel kernel in the X direction, the pixel that previously had a value of 150 may be replaced with a value of 120 (the median of the five-pixel gray levels). Once the operation is complete, the kernel may shift by one pixel and the operation may repeat. Median filtering can be used to remove "salt-and-pepper" noise.

The training image may be modified using low-pass filtering. Low-pass filtering operates similar to median filtering, but involves replacing a kernel's center pixel with the average of all of the kernel's pixels.

At 103, the deep learning module may be trained. The deep learning module may be trained, for example, using one or more of the techniques described herein.

Figure 1B:
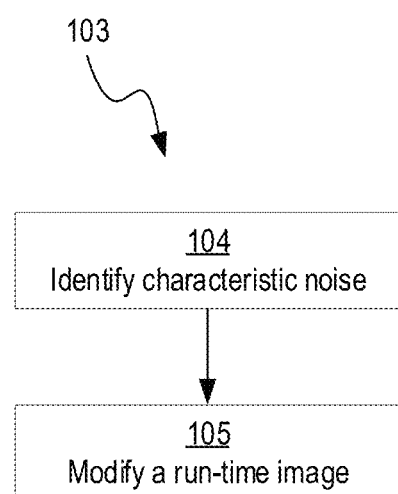
FIG. 1B illustrates an embodiment operation of a deep learning module.

Training the deep learning module at 103 may be performed as illustrated in FIG. 1B. Training the deep learning module at 103 may include training the deep learning module to identify the characteristic noise at 104 in a later run-time image of a run-time die and then modify a run-time image at 105 such that the characteristic noise is reduced.

Modifying the training image may generate a de-noised training image. Training the deep learning module to identify the characteristic noise may include comparing a portion of the training image with a corresponding portion of the de-noised training image.

Figure 2A:
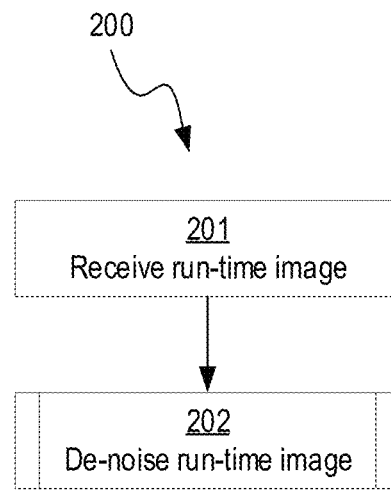
FIG. 2A illustrates an embodiment method for run-time de-noising.

FIG. 2A depicts an embodiment method 200. Method 200 may use a trained deep learning module, e.g., the deep learning module trained using method 100, to de-noise a run-time image. At 201, a run-time image may be received. The run-time image may be captured by—and received from—an image sensor of an optical metrology tool. At 202, the run-time image may be de-noised. De-noising may be performed using the deep learning module trained at 103.

Figure 2B:
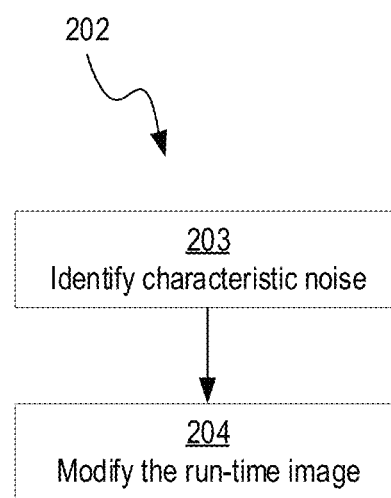
FIG. 2B illustrates use of a deep learning module for run-time de-noising.

De-noising the run-time image at 202 may be performed as illustrated in FIG. 2B. De-noising the run-time image at 202 may include, using the trained deep learning module, identifying the characteristic noise in the run-time image at 203 and then modifying the run-time image at 204. Accordingly, the run-time image is de-noised using the trained deep learning module, thereby generating a de-noised run-time image.

Modifying the run-time image to reduce the characteristic noise, thus de-noising the run-time image, may include down-sampling the run-time image using an encoder layer to generate a sparse-representation of the run-time image. Then, the sparse-representation may be up-sampled using a decoder layer to generate a de-noised run-time image. The encoder layer may include a convolution layer and/or a maxpool layer. The decoder layer may include a deconvolution layer and/or a un-maxpool layer. The deep learning module in various embodiments may be, for example, a fully-connected autoencoder, a simple stacked de-noising autoencoder, or a convolutional neural network.

The training images or run-time images, or both, may be obtained using wafer swathing techniques, using, for example, a charge-coupled device (CCD) sensor or time-delay and integration (TDI) sensor.

Figure 3:
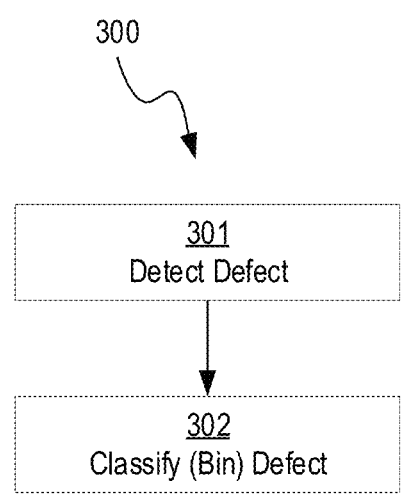
FIG. 3 illustrates a method for defect detection and review.

FIG. 3 depicts method 300 for using a de-noised run-time image to identify and classify defects. At 301, one or more defects are detected. Defects may be detected from a run-time image obtained using an optical metrology tool. Obtaining the run-time image may be performed using a wafer swathing technique. From this run-time image, defects may be identified and considered candidates for classification as DOIs or nuisance.

At 302, the one or more defects are classified (i.e., binned). Defects having attributes of a real defect may be classified as DOIs, and defects not having said attributes may be classified as nuisance.

Figure 4:
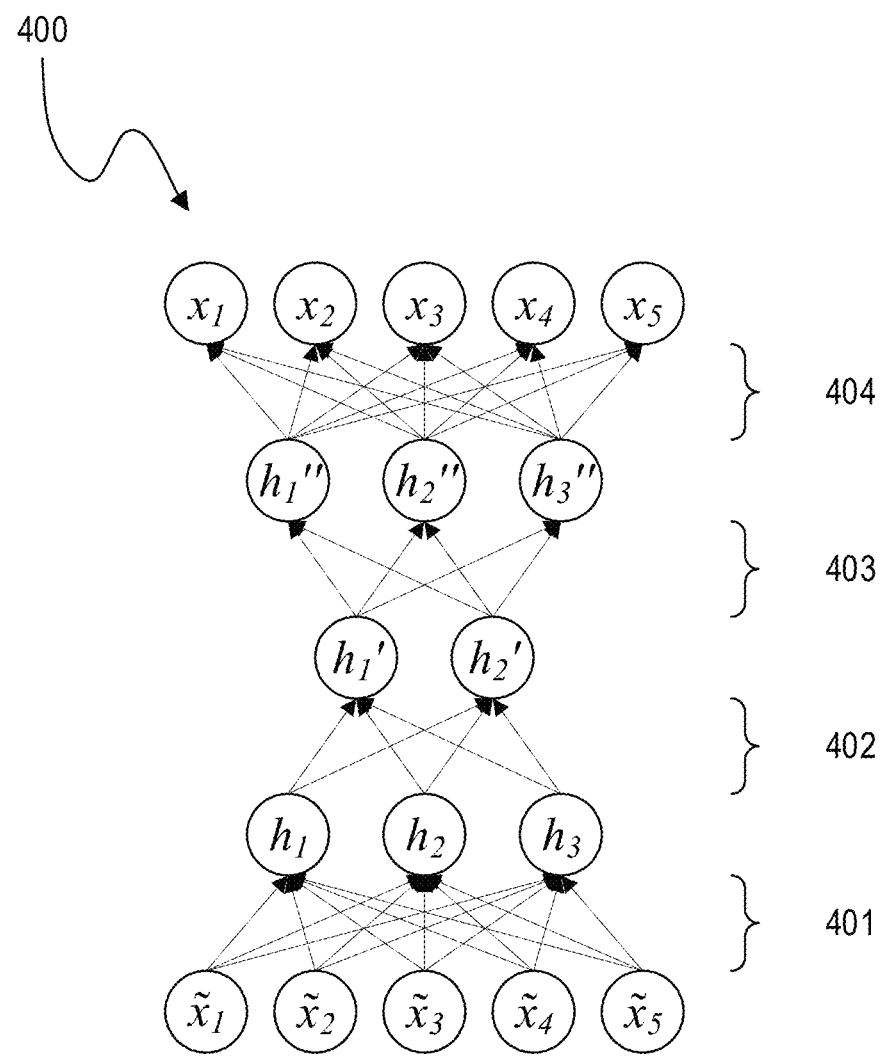
FIG. 4 illustrates an example simple stacked de-noising autoencoder.

FIG. 4 depicts an example of a simple stacked de-noising autoencoder (SSDA) 400 used as a deep learning module, the concept of which some embodiments herein employ. In the SSDA 400, the input image portions $\tilde{x}_1$ through $\tilde{x}_5$ may be down-sampled through a series of convolution and/or maxpool layers, e.g., layers 401 and 402 to reach a sparse representation of the input, given by $h_1'$ through $h_2'$, with $h_1$ through $h_3$ representing an intermediate representation between layers 401 and 402. Once the sparse representation $h_1'$ through $h_2'$ is obtained, the obtained set of numbers may then be up-sampled through a series of deconvolution and/or un-maxpool layers, e.g., layers 403 and 404 to map the sparse representation to clean/de-noised image portions $x_1$ through $x_5$, with $h_1''$ through $h_2''$ representing an intermediate representation between layers 403 and 404. Using convolution/maxpool and deconvolution/un-maxpool layers may effectively reduce the number of network parameters, making it easier to train the deep learning module while also avoiding over-fitting of the network to given samples in the training set.

In another embodiment, a non-transitory computer-readable storage medium may comprise one or more programs for executing the steps of method 100, 200, or 300 on one or more computing devices. The one or more programs composing the non-transitory computer-readable storage medium may further comprise steps for performing additional embodiments of methods 100, 200, or 300 as disclosed herein.

In another embodiment, a system may comprise an optical metrology tool. The metrology tool may include a run-time die disposed on a specimen (e.g., specimen 502 or 604), a run-time image sensor (e.g., detector 512, 509, or 607), and a processor (e.g., processor 514 or 608) in electronic communication with the run-time image sensor. The run-time image sensor may be configured to capture a run-time image of the run-time die. This run-time image may be de-noised using the deep learning module trained at the processor. The processor may be configured to carry out some or all of the steps of methods 100, 200, and 300.

The run-time die may compose an advanced Wafer Level Package (aWLP). Wafer Level Packaging (WLP) segment is an umbrella term used for all the packaging process in which die packages are made prior to dies being diced, i.e., at the wafer-level itself. aWLP refers to latest state-of-the-art techniques for developing such WLPs including fabricating small design rule line-space/via patterns.

Figure 5:
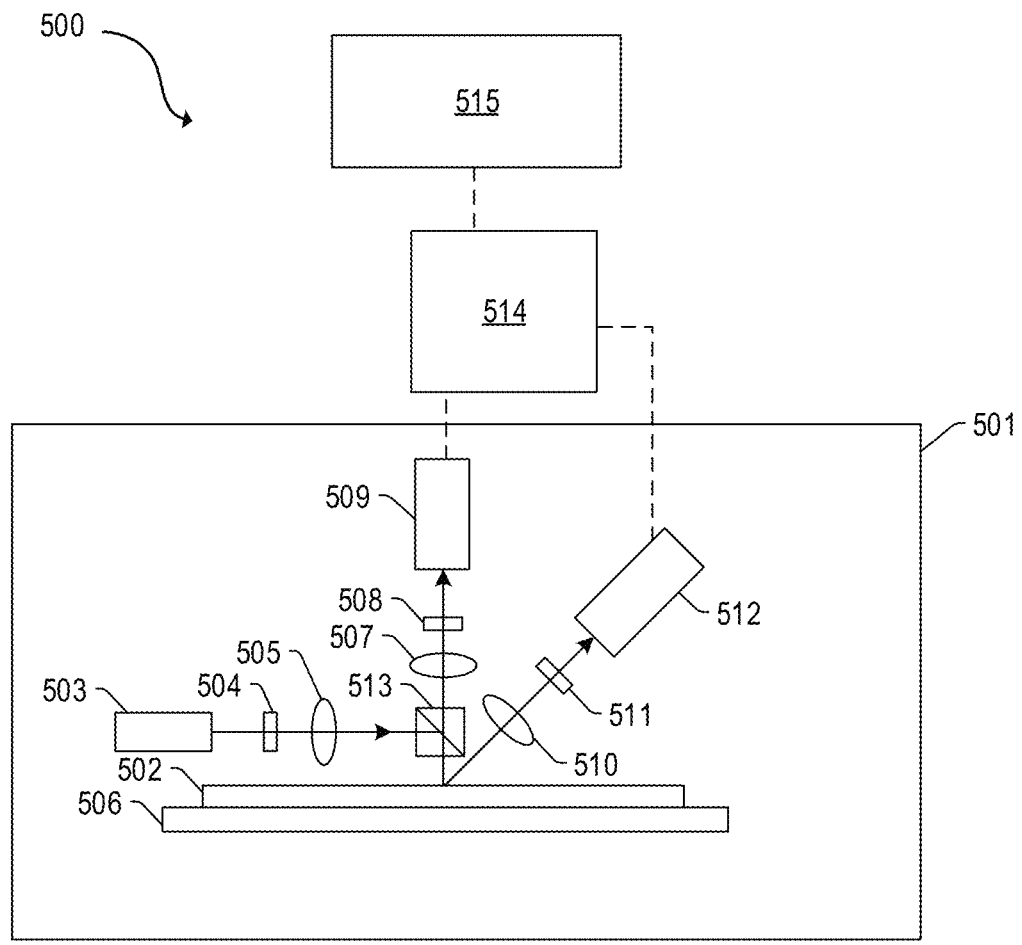
FIG. 5 illustrates an embodiment optical system.

One embodiment of a system 500 is shown in FIG. 5. The system 500 includes optical based subsystem 501. In general, the optical based subsystem 501 is configured for generating optical based output for a specimen 502 by directing electromagnetic radiation (i.e. light) to (or scanning light over) and detecting light from the specimen 502. In one embodiment, the specimen 502 includes a wafer. The wafer may include any wafer known in the art. In another embodiment, the specimen includes a reticle. The reticle may include any reticle known in the art.

In the embodiment of the system 500 shown in FIG. 5, optical based subsystem 501 includes an illumination subsystem configured to direct light to specimen 502. The illumination subsystem includes at least one light source. For example, as shown in FIG. 5, the illumination subsystem includes light source 503. In one embodiment, the illumination subsystem is configured to direct the light to the specimen 502 at one or more angles of incidence, which may include one or more oblique angles and/or one or more normal angles. For example, as shown in FIG. 5, light from light source 503 is directed through optical element 504 and then lens 505 to specimen 502 at an oblique angle of incidence. The oblique angle of incidence may include any suitable oblique angle of incidence, which may vary depending on, for instance, characteristics of the specimen 502.

The optical based subsystem 501 may be configured to direct the light to the specimen 502 at different angles of incidence at different times. For example, the optical based subsystem 501 may be configured to alter one or more characteristics of one or more elements of the illumination subsystem such that the light can be directed to the specimen 502 at an angle of incidence that is different than that shown in FIG. 5. In one such example, the optical based subsystem 501 may be configured to move light source 503, optical element 504, and lens 505 such that the light is directed to the specimen 502 at a different oblique angle of incidence or a normal (or near-normal) angle of incidence.

In some instances, the optical based subsystem 501 may be configured to direct light to the specimen 502 at more than one angle of incidence at the same time. For example, the illumination subsystem may include more than one illumination channel, one of the illumination channels may include light source 503, optical element 504, and lens 505 as shown in FIG. 5 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 502 at different angles of incidence may be different such that light resulting from illumination of the specimen 502 at the different angles of incidence can be discriminated from each other at the detector(s).

In another instance, the illumination subsystem may include only one light source (e,g., light source 503 shown in FIG. 5) and light from the light source may be separated into different optical paths (e.g., based on wavelength, polarization, etc.) by one or more optical elements (not shown) of the illumination subsystem. Light in each of the different optical paths may then be directed to the specimen 502. Multiple illumination channels may be configured to direct light to the specimen 502 at the same time or at different times (e.g., when different illumination channels are used to sequentially illuminate the specimen). In another instance, the same illumination channel may be configured to direct light to the specimen 502 with different characteristics at different times. For example, in some instances, optical element 504 may be configured as a spectral filter and the properties of the spectral filter can be changed in a variety of different ways (e.g., by swapping out the spectral filter) such that different wavelengths of light can be directed to the specimen 502 at different times. The illumination subsystem may have any other suitable configuration known in the art for directing the light having different or the same characteristics to the specimen 502 at different or the same angles of incidence sequentially or simultaneously.

In one embodiment, light source 503 may include a broadband plasma (BBP) source. In this manner, the light generated by the light source 503 and directed to the specimen 502 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 503 may also include a polychromatic light source that generates light at multiple discrete wavelengths or wavebands.

Light from optical element 504 may be focused onto specimen 502 by lens 505. Although lens 505 is shown in FIG. 5 as a single refractive optical element, it is to be understood that, in practice, lens 505 may include a number of refractive and/or reflective optical elements that in combination focus the light from the optical element to the specimen. The illumination subsystem shown in FIG. 5 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 513), aperture(s), and the like, which may include any such suitable optical elements known in the art. In addition, the optical based subsystem 501 may be configured to alter one or more of the elements of the illumination subsystem based on the type of illumination to be used for generating the optical based output.

The optical based subsystem 501 may also include a scanning subsystem configured to cause the light to be scanned over the specimen 502. For example, the optical based subsystem 501 may include stage 506 on which specimen 502 is disposed during optical based output generation. The scanning subsystem may include any suitable mechanical and/or robotic assembly (that includes stage 506) that can be configured to move the specimen 502 such that the light can be scanned over the specimen 502. In addition, or alternatively, the optical based subsystem 501 may be configured such that one or more optical elements of the optical based subsystem 501 perform some scanning of the light over the specimen 502. The light may be scanned over the specimen 502 in any suitable fashion such as in a serpentine-like path or in a spiral path.

The optical based subsystem 501 further includes one or more detection channels. At least one of the one or more detection channels includes a detector configured to detect light from the specimen 502 due to illumination of the specimen 502 by the subsystem and to generate output responsive to the detected light. For example, the optical based subsystem 501 shown in FIG. 5 includes two detection channels, one formed by collector 507, element 508, and detector 509 and another formed by collector 510, element 511, and detector 512. As shown in FIG. 5, the two detection channels are configured to collect and detect light at different angles of collection. In some instances, both detection channels are configured to detect scattered light, and the detection channels are configured to detect tight that is scattered at different angles from the specimen 502. However, one or more of the detection channels may be configured to detect another type of light from the specimen 502 (e.g., reflected light).

As further shown in FIG. 5, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 510, element 511, and detector 512 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 5 shows an embodiment of the optical based subsystem 501 that includes two detection channels, the optical based subsystem 501 may include a different number of detection channels (e.g., only one detection channel or two or more detection channels). In one such instance, the detection channel formed by collector 510, element 511, and detector 512 may form one side channel as described above, and the optical based subsystem 501 may include an additional detection channel (not shown) formed as another side channel that is positioned on the opposite side of the plane of incidence. Therefore, the optical based subsystem 501 may include the detection channel that includes collector 507, element 508, and detector 509 and that is centered in the plane of incidence and configured to collect and detect light at scattering angle(s) that are at or close to normal to the specimen 502 surface. This detection channel may therefore be commonly referred to as a "top" channel, and the optical based subsystem 501 may also include two or more side channels configured as described above. As such, the optical based subsystem 501 may include at least three channels (i.e., one top channel and two side channels), and each of the at least three channels has its own collector, each of which is configured to collect light at different scattering angles than each of the other collectors.

As described further above, each of the detection channels included in the optical based subsystem 501 may be configured to detect scattered light. Therefore, the optical based subsystem 501 shown in FIG. 5 may be configured for dark field (DF) output generation for specimens 502. However, the optical based subsystem 501 may also or alternatively include detection channel(s) that are configured for bright field (BF) output generation for specimens 502. In other words, the optical based subsystem 501 may include at least one detection channel that is configured to detect light specularly reflected from the specimen 502. Therefore, the optical based subsystems 501 described herein may be configured for only DF, only BF, or both DF and BF imaging. Although each of the collectors is shown in FIG. 5 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 514 may be configured to generate images of the specimen 502 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 5 is provided herein to generally illustrate a configuration of an optical based subsystem 501 that may be included in the system embodiments described herein or that may generate optical based output that is used by the system embodiments described herein. The optical based subsystem 501 configuration described herein may be altered to optimize the performance of the optical based subsystem 501 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 514 may be coupled to the components of the system 500 in any suitable manner (e.g., via one or more transmission media, which may include wired and/or wireless transmission media) such that the processor 514 can receive output. The processor 514 may be configured to perform a number of functions using the output. The system 500 can receive instructions or other information from the processor 514. The processor 514 and/or the electronic data storage unit 515 optionally may be in electronic communication with a wafer inspection tool, a wafer metrology tool, or a wafer review tool (not illustrated) to receive additional information or send instructions. For example, the processor 514 and/or the electronic data storage unit 515 can be in electronic communication with an SEM.

Figure 6:
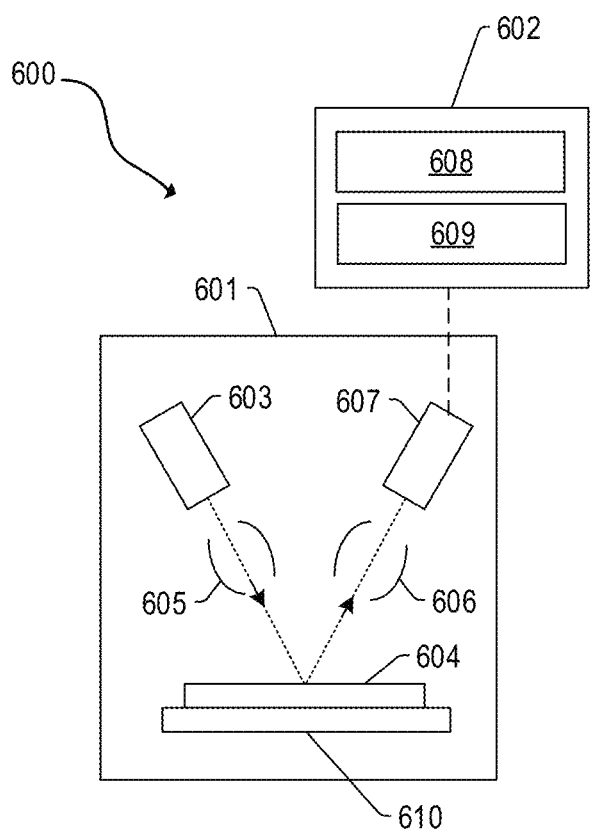
FIG. 6 illustrates an embodiment electron beam system.

FIG. 6 is a block diagram of an embodiment of a system 600. The system 600 includes a wafer inspection tool (which includes the electron column 601) configured to generate images of a wafer 604.

The wafer inspection tool includes an output acquisition subsystem that includes at least an energy source and a detector. The output acquisition subsystem may be an electron beam-based output acquisition subsystem. For example, in one embodiment, the energy directed to the wafer 604 includes electrons, and the energy detected from the wafer 604 includes electrons. In this manner, the energy source may be an electron beam source. In one such embodiment shown in FIG. 6, the output acquisition subsystem includes electron column 601, which is coupled to computer subsystem 602. A stage 610 may hold the wafer 604.

As also shown in FIG. 6, the electron column 601 includes an electron beam source 603 configured to generate electrons that are focused to wafer 604 by one or more elements 605. The electron beam source 603 may include, for example, a cathode source or emitter tip. The one or more elements 605 may include, for example, a gun lens, an anode, a beam limiting aperture, a gate valve, a beam current selection aperture, an objective lens, and a scanning subsystem, all of which may include any such suitable elements known in the art.

Electrons returned from the wafer 604 (e.g., secondary electrons) may be focused by one or more elements 606 to detector 607. One or more elements 606 may include, for example, a scanning subsystem, which may be the same scanning subsystem included in element(s) 605.

The electron column 601 also may include any other suitable elements known in the art.

Although the electron column 601 is shown in FIG. 6 as being configured such that the electrons are directed to the wafer 604 at an oblique angle of incidence and are scattered from the wafer 604 at another oblique angle, the electron beam may be directed to and scattered from the wafer 604 at any suitable angles. In addition, the electron beam-based output acquisition subsystem may be configured to use multiple modes to generate images of the wafer 604 (e.g., with different illumination angles, collection angles, etc.). The multiple modes of the electron beam-based output acquisition subsystem may be different in any image generation parameters of the output acquisition subsystem.

Computer subsystem 602 may be coupled to detector 607 as described above. The detector 607 may detect electrons returned from the surface of the wafer 604 thereby forming electron beam images of the wafer 604. The electron beam images may include any suitable electron beam images. Computer subsystem 602 may be configured to perform any of the functions described herein using the output of the detector 607 and/or the electron beam images. Computer subsystem 602 may be configured to perform any additional step(s) described herein. A system 600 that includes the output acquisition subsystem shown in FIG. 6 may be further configured as described herein.

It is noted that FIG. 6 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Although the output acquisition subsystem is described above as being an electron beam-based output acquisition subsystem, the output acquisition subsystem may be an ion beam-based output acquisition subsystem. Such an output acquisition subsystem may be configured as shown in FIG. 6 except that the electron beam source may be replaced with any suitable ion beam source known in the art. In addition, the output acquisition subsystem may be any other suitable ion beam-based output acquisition subsystem such as those included in commercially available focused ion beam (FIB) systems, helium ion microscopy (HIM) systems, and secondary ion mass spectroscopy (SIMS) systems.

The computer subsystem 602 includes a processor 608 and an electronic data storage unit 609. The processor 608 may include a microprocessor, a microcontroller, or other devices.

The computer subsystem 602 may be coupled to the components of the system 600 in any suitable manner (e.g., via one or more transmission media, which may include wired and/or wireless transmission media) such that the processor 608 can receive output. The processor 608 may be configured to perform a number of functions using the output. The wafer inspection tool can receive instructions or other information from the processor 608. The processor 608 and/or the electronic data storage unit 609 optionally may be in electronic communication with another wafer inspection tool, a wafer metrology tool, or a wafer review tool (not illustrated) to receive additional information or send instructions.

The processor 608 is in electronic communication with the wafer inspection tool, such as the detector 607. The processor 608 may be configured to process images generated using measurements from the detector 607. For example, the processor may perform embodiments of the methods 100, 200, or 300.

The processor 514 or 608, or computer subsystem 602, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 514 or 608 and electronic data storage unit 515 or 609, respectively, may be disposed in or otherwise part of the system 500 or 600, respectively or another device. In an example, the processor 514 or 608 and electronic data storage unit 515 or 609, respectively, may be part of a standalone control unit or in a centralized quality control unit. Multiple processors 514 or 608 or electronic data storage units 515 or 609 may be used.

The processor 514 or 608 may be implemented in practice by any combination of hardware, software, and firmware. Also, the functions of processor 514 or 608 as described herein may be performed by one unit, or divided up among different components, each of which may be implemented in turn by any combination of hardware, software, and firmware. Program code or instructions for the processor 514 or 608 to implement various methods and functions may be stored in readable storage media, such as a memory in the electronic data storage unit 515 or 609, respectively, or other memory.

If the system 500 or 600 includes more than one processor 514 or 608, respectively, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 514 or 608 may be configured to perform a number of functions using the output of the system 500 or 600, respectively, or other output. For instance, the processor 514 or 608 may be configured to send the output to an electronic data storage unit 515 or 609, respectively, or another storage medium. The processor 514 or 608 may be further configured as described herein.

If the system 500 or 600 includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 514 or 608 may be configured according to any of the embodiments described herein. The processor 514 or 608 also may be configured to perform other functions or additional steps using the output of the system 500 or 600, respectively, or using images or data from other sources.

The processor 514 or 608, or computer subsystem 602 may be part of a defect review system, an inspection system, a metrology system, or some other type of system. Thus, the embodiments disclosed herein describe some configurations that can be tailored in a number of manners for systems having different capabilities that are more or less suitable for different applications.

The processor 514 or 608 may be communicatively coupled to any of the various components or sub-systems of system 500 or 600, respectively, in any manner known in the art. Moreover, the processor 514 or 608 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 514 or 608 and other subsystems of the system 500 or 600, respectively, or systems external to system 500 or 600, respectively.

Various steps, functions, and/or operations of system 500 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 514 or 608 or, alternatively, multiple processors 514 or 608. Moreover, different sub-systems of the system 500 may include one or more computing or logic systems. Therefore, the above description should not be interpreted as a limitation on the present disclosure but merely an illustration.

In an instance, the processor 514 or 608 is in communication with the system 500 or 600, respectively. The processor 514 or 608 is configured to receive a training image of a training die, the training image having a characteristic noise and modify the training image such that the characteristic noise is reduced. The processor 514 or 608 may be further configured to train a deep learning module to identify the characteristic noise in a run-time image of a run-time die and modify the run-time image to reduce the characteristic noise. The processor may be further configured to receive the run-time image captured by an image sensor (detector 509) or detector 607, respectively of an optical metrology tool (system 500) or e-beam metrology tool (system 600), respectively. The processor may be further configured to, with the deep learning module, identify the characteristic noise in the run-time image and modify the run-time image to reduce the characteristic noise, thereby generating a de-noised run-time image.

An additional embodiment relates to a non-transitory computer-readable medium storing program instructions executable on a processor for performing a computer-implemented method for determining a height of an illuminated region on a surface of a specimen 502, as disclosed herein. In particular, as shown in FIG. 5 or FIG. 6, electronic data storage unit 515 or 609, respectively, or other storage medium may contain non-transitory computer-readable medium that includes program instructions executable on the processor 514 or 608, respectively. The computer-implemented method may include any step(s) of any method(s) described herein, including methods 100, 200, and 300.

Program instructions implementing methods such as those described herein may be stored on computer-readable medium, such as in the electronic data storage unit 515 or 609 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

The component(s) executed by the processor, can include a deep learning module (e.g., a convolutional neural network (CNN) module). The deep learning module can have one of the configurations described further herein. Rooted in neural network technology, deep learning is a probabilistic graph model with many neuron layers, commonly known as a deep architecture. Deep learning technology processes the information such as image, text, voice, and so on in a hierarchical manner. In using deep learning in the present disclosure, feature extraction is accomplished automatically using learning from data. For example, features to reference in determining rotation and translation offsets can be extracted using the deep learning module based on the one or more extracted features.

Generally speaking, deep learning (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output, allowing the algorithm to use multiple processing layers, composed of multiple linear and non-linear transformations.

Deep learning is part of a broader family of machine learning methods based on learning representations of data. An observation (e.g., a feature to be extracted for reference) can be represented in many ways such as a vector of intensity values per pixel, or in a more abstract way as a set of edges, regions of particular shape, etc. Some representations are better than others at simplifying the learning task (e.g., face recognition or facial expression recognition). Deep learning can provide efficient algorithms for unsupervised or semi-supervised feature learning and hierarchical feature extraction.

Research in this area attempts to make better representations and create models to learn these representations from large-scale data. Some of the representations are inspired by advances in neuroscience and are loosely based on interpretation of information processing and communication patterns in a nervous system, such as neural coding which attempts to define a relationship between various stimuli and associated neuronal responses in the brain.

There are many variants of neural networks with deep architecture depending on the probability specification and network architecture, including, but not limited to, Deep Belief Networks (DBN), Restricted Boltzmann Machines (RBM), and Auto-Encoders. Another type of deep neural network, a CNN, can be used for feature analysis. The actual implementation may vary depending on the size of input images, the number of features to be analyzed, and the nature of the problem. Other layers may be included in the deep learning module besides the neural networks disclosed herein.

In an embodiment, the deep learning module is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. Machine learning explores the study and construction of algorithms that can learn from and make predictions on data. Such algorithms overcome following strictly static program instructions by making data driven predictions or decisions, through building a model from sample inputs.

In some embodiments, the deep learning module is a generative model. A generative model can be generally defined as a model that is probabilistic in nature. In other words, a generative model is one that performs forward simulation or rule-based approaches. The generative model can be learned (in that its parameters can be learned) based on a suitable training set of data. In one embodiment, the deep learning module is configured as a deep generative model. For example, the model may be configured to have a deep learning architecture in that the model may include multiple layers, which perform a number of algorithms or transformations.

In another embodiment, the deep learning module is configured as a neural network. In a further embodiment, the deep learning module may be a deep neural network with a set of weights that model the world according to the data that it has been fed to train it. Neural networks can be generally defined as a computational approach, based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically comprise multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the deep learning module used for the semiconductor inspection applications disclosed herein is configured as an AlexNet. For example, an AlexNet includes a number of convolutional layers (e.g., 5) followed by a number of fully connected layers (e.g., 3) that are, in combination, configured and trained to analyze features for determining rotation and translation offsets. In another such embodiment, the deep learning module used for the semiconductor inspection applications disclosed herein is configured as a GoogleNet. For example, a GoogleNet may include layers such as convolutional, pooling, and fully connected layers such as those described further herein configured and trained to analyze features for determining rotation and translation offsets. While the GoogleNet architecture may include a relatively high number of layers (especially compared to some other neural networks described herein), some of the layers may be operating in parallel, and groups of layers that function in parallel with each other are generally referred to as inception modules. Other of the layers may operate sequentially. Therefore, GoogleNets are different from other neural networks described herein in that not all of the layers are arranged in a sequential structure. The parallel layers may be similar to Google's Inception Network or other structures.

In a further such embodiment, the deep learning module used for the semiconductor inspection applications disclosed herein is configured as a Visual Geometry Group (VGG) network. For example, VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to analyze features for determining rotation and translation offsets. VGG networks also include convolutional layers followed by fully connected layers.

In some such embodiments, the deep learning module used for the semiconductor inspection applications disclosed herein is configured as a deep residual network. For example, like some other networks described herein, a deep residual network may include convolutional layers followed by fully-connected layers, which are, in combination, configured and trained for feature property extraction. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart.

In a further such embodiment, the deep learning module used for the semiconductor inspection applications disclosed herein includes one or more fully connected layers configured for analyzing features for determining rotation and translation offsets. A fully connected layer may be generally defined as a layer in which each of the nodes is connected to each of the nodes in the previous layer. The fully connected layer(s) may perform classification based on the features extracted by convolutional layer(s), which may be configured as described further herein. The fully connected layer(s) are configured for feature selection and classification. In other words, the fully connected layer(s) select features from a feature map and then analyze the input image(s) based on the selected features. The selected features may include all of the features in the feature map (if appropriate) or only some of the features in the feature map.

In some embodiments, the information determined by the deep learning module includes feature properties extracted by the deep learning module. In one such embodiment, the deep learning module includes one or more convolutional layers. The convolutional layer(s) may have any suitable configuration known in the art. In this manner, the deep learning module (or at least a part of the deep learning module) may be configured as a CNN. For example, the deep learning module may be configured as a CNN, which is usually stacks of convolution and pooling layers, to extract local features. The embodiments described herein can take advantage of deep learning concepts such as a CNN to solve the normally intractable representation inversion problem. The deep learning module may have any CNN configuration or architecture known in the art. The one or more pooling layers may also have any suitable configuration known in the art (e.g., max pooling layers) and are generally configured for reducing the dimensionality of the feature map generated by the one or more convolutional layers while retaining the most important features.

In general, the deep learning module described herein is a trained deep learning module. For example, the deep learning module may be previously trained by one or more other systems and/or methods. The deep learning module is already generated and trained and then the functionality of the module is determined as described herein, which can then be used to perform one or more additional functions for the deep learning module.

As stated above, although a CNN is used herein to illustrate the architecture of a deep learning system, the present disclosure is not limited to a CNN. Other variants of deep learning architectures may be used in embodiments. For example, Auto-Encoders, DBNs, and RBMs, can be used. Random forests also can be used.

Training data may be inputted to module training (e.g., CNN training), which may be performed in any suitable manner. For example, the module training may include inputting the training data to the deep learning module (e.g., a CNN) and modifying one or more parameters of the module until the output of the module is the same as (or substantially the same as) external validation data. Module training may generate one or more trained modules, which may then be sent to module selection, which is performed using validation data. The results that are produced by each one or more trained modules for the validation data that is input to the one or more trained modules may be compared to the validation data to determine which of the modules is the best module. For example, the module that produces results that most closely match the validation data may be selected as the best module. Test data may then be used for module evaluation of the module that is selected (e.g., the best module). Module evaluation may be performed in any suitable manner. Best module may also be sent, to module deployment in which the best module may be sent to the semiconductor inspection tool for use (post-training mode).

Embodiments have a potential to, inter alia, significantly reduce the cost of ownership for, and classification efforts by an operator of a defect inspection and/or review tool. Embodiments improve the defect inspection, classification, and review processes, including for aWLP products or other semiconductor fabrication products, by overcoming the challenged presented by grain-induced noise (e.g., due to copper roughness). Embodiments reduce overall defect count by better avoiding nuisance, thereby increasing efficiency in terms of throughput as a result of reduce time taken for defect review.

The steps of the method described in the various embodiments and examples disclosed herein are sufficient to carry out the methods of the present disclosure. Thus, in an embodiment, the method consists essentially of a combination of the steps of the methods disclosed herein. In another embodiment, the method consists of such steps.

Although the present disclosure has been described with respect to one or more particular embodiments, it will be understood that other embodiments of the present disclosure may be made without departing from the scope of the present disclosure.

What is claimed is:

1. A method comprising, using a processor:
   receiving a run-time image of a run-time die captured by an image sensor of a metrology tool; and
   with a deep learning module trained to identify a characteristic noise in the run-time image and modify the run-time image to reduce the characteristic noise:
      identifying the characteristic noise in the run-time image, and
      modifying the run-time image to reduce the characteristic noise, thereby generating a de-noised run-time image, wherein modifying the run-time image to reduce the characteristic noise includes:
         down-sampling the run-time image using an encoder layer, thereby generating a sparse-representation; and
         up-sampling the sparse-representation using a decoder layer, thereby generating the de-noised run-time image.

2. The method of claim 1, further comprising, using the processor:
   receiving a training image of a training die, the training image having the characteristic noise;
   modifying the training image such that the characteristic noise is reduced; and
   training the deep learning module to:
      identify the characteristic noise in the run-time image, and
      modify the run-time image to reduce the characteristic noise.

3. The method of claim 2, wherein:
   modifying the training image generates a de-noised training image, and
   training the deep learning module to identify the characteristic noise includes comparing a portion of the training image with a corresponding portion of the de-noised training image.

4. The method of claim 2, wherein modifying the training image comprises:
   pixel blob selection and smoothing;
   dilation;
   erosion;
   blurring;
   template replication;
   flood fill;
   median filtering; or
   low-pass filtering.

5. The method of claim 1, further comprising, using the processor, detecting a defect in the de-noised run-time image.

6. The method of claim 5, further comprising, using the processor, classifying the defect as a defect-of-interest or a nuisance.

7. The method of claim 1, wherein the deep learning module is:
a fully-connected autoencoder; or
a convolutional neural network.

8. The method of claim 1, wherein the encoder layer is a convolution layer or a maxpool layer and the decoder layer is a deconvolution layer or a max-unpool layer.

9. A system comprising:
a metrology tool including:
   a run-time image sensor configured to capture a run-time image of a run-time die on a specimen; and
   a processor in electronic communication with the run-time image sensor configured to:
      receive the run-time image from the run-time image sensor; and
      with a deep learning module trained to identify a characteristic noise in the run-time image and modify the run-time image to reduce the characteristic noise:
         identify the characteristic noise in the run-time image, and
         modify the run-time image to reduce the characteristic noise and thereby generate a de-noised run-time image, wherein modifying the run-time image to reduce the characteristic noise includes:
            down-sampling the run-time image using an encoder layer, thereby generating a sparse-representation; and
            up-sampling the sparse-representation using a decoder layer, thereby generating the de-noised run-time image.

10. The system of claim 9, wherein the processor is further configured to:
receive a training image of a training die, the training image having the characteristic noise;
modify the training image such that the characteristic noise is reduced; and
train the deep learning module to:
   identify the characteristic noise in the run-time image, and
   modify the run-time image to reduce the characteristic noise.

11. The system of claim 9, wherein the processor is further configured to detect a defect in the de-noised run-time image.

12. The system of claim 11, wherein the processor is further configured to classify the defect as a defect-of-interest or a nuisance.

13. The system of claim 9, wherein the run-time image sensor is:
a charge-coupled device, or
a time-delay and integration sensor.

14. The system of claim 9, wherein the run-time die composes an advanced wafer level package.

15. The system of claim 9, wherein the run-time image sensor is configured to detect photons or electrons received from the specimen.

16. A non-transitory computer-readable storage medium, comprising one or more programs for executing the following steps on one or more computing devices:
receive a run-time image of a run-time die captured by an image sensor of a metrology tool; and
with a deep learning module trained to identify a characteristic noise in the run-time image and modify the run-time image to reduce the characteristic noise:
   identify the characteristic noise in the run-time image, and
   modify the run-time image to reduce the characteristic noise and thereby generate a de-noised run-time image, wherein modifying the run-time image to reduce the characteristic noise includes:
      down-sampling the run-time image using an encoder layer, thereby generating a sparse-representation; and
      up-sampling the sparse-representation using a decoder layer, thereby generating the de-noised run-time image.

17. The non-transitory computer-readable storage medium of claim 16, wherein the one or more programs include executing the following steps on one or more computing devices:
receive a training image of a training die, the training image having the characteristic noise;
modify the training image such that the characteristic noise is reduced; and
train the deep learning module to:
   identify the characteristic noise in the run-time image, and
   modify the run-time image to reduce the characteristic noise.

18. The non-transitory computer-readable storage medium of claim 17, wherein the one or more programs include executing the following step on the one or more computing devices:
classify the defect as a defect-of-interest or a nuisance.

19. The non-transitory computer-readable storage medium of claim 16, wherein the one or more programs include executing the following step on the one or more computing devices:
detect a defect in the de-noised run-time image.

* * * * *